US008835013B2

(12) United States Patent
Matsushima et al.

(10) Patent No.: US 8,835,013 B2
(45) Date of Patent: Sep. 16, 2014

(54) METHOD FOR FORMING MULTILAYER COATING FILM

(75) Inventors: Naoto Matsushima, Hiratsuka (JP); Takeshi Matsuda, Hiratsuka (JP); Yusuke Kurata, Wako (JP); Satoru Ihara, Wako (JP)

(73) Assignees: Kansai Paint Co., Ltd., Hyogo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/635,002

(22) PCT Filed: Apr. 8, 2011

(86) PCT No.: PCT/JP2011/058890
§ 371 (c)(1),
(2), (4) Date: Sep. 14, 2012

(87) PCT Pub. No.: WO2011/132551
PCT Pub. Date: Oct. 27, 2011

(65) Prior Publication Data
US 2013/0004776 A1    Jan. 3, 2013

(30) Foreign Application Priority Data
Apr. 20, 2010 (JP) ................................ 2010-096902

(51) Int. Cl.
*B32B 27/36* (2006.01)
*B05D 7/16* (2006.01)
*B05D 1/36* (2006.01)
*C09D 5/44* (2006.01)
*C09D 167/00* (2006.01)
*B05D 7/00* (2006.01)
*C09D 175/06* (2006.01)
*C08G 18/79* (2006.01)
*C08G 18/42* (2006.01)
*C09D 5/28* (2006.01)
*C08K 5/29* (2006.01)
*C08K 5/103* (2006.01)
*C08K 5/101* (2006.01)

(52) U.S. Cl.
CPC .......... *C08G 18/4263* (2013.01); *C09D 5/4488* (2013.01); *C09D 167/00* (2013.01); *B05D 7/572* (2013.01); *C09D 175/06* (2013.01); *C08G 18/792* (2013.01); *C08G 18/797* (2013.01); *B05D 2401/20* (2013.01); *C08K 5/29* (2013.01); *C08K 5/103* (2013.01); *B05D 2507/00* (2013.01); *C08K 5/101* (2013.01); *C09D 5/28* (2013.01)
USPC ..... 428/480; 427/407.1; 427/409; 427/412.1; 427/412.3; 427/412.4; 427/412.5; 427/385.5

(58) Field of Classification Search
USPC ............. 427/407.1, 409, 412.1–412.5, 372.2, 427/384, 385.5; 428/480
See application file for complete search history.

(56) References Cited

U.S. PATENT DOCUMENTS

| 6,248,819 | B1 | 6/2001 | Masuda et al. |
|---|---|---|---|
| 6,428,856 | B1 | 8/2002 | Masuda et al. |
| 8,563,636 | B2 * | 10/2013 | Wada et al. .................... 524/127 |
| 2008/0199625 | A1 | 8/2008 | Niwa |
| 2010/0129662 | A1 | 5/2010 | Ogawa et al. |
| 2010/0189906 | A1 | 7/2010 | Kume et al. |
| 2011/0135935 | A1 | 6/2011 | Adachi et al. |

FOREIGN PATENT DOCUMENTS

| JP | 2001-9357 | 1/2001 |
|---|---|---|
| JP | 2002-282773 | 10/2002 |
| JP | 2008-223013 | 9/2008 |
| JP | 2009-28576 | 2/2009 |
| JP | 2009-262001 | 11/2009 |
| WO | 2009/031198 | 3/2009 |
| WO | 2009/131234 | 10/2009 |
| WO | 2010/018872 | 2/2010 |

OTHER PUBLICATIONS

English-language machine translation of the Detailed Description of JP 2008-223013 A, generated Jul. 29, 2013, 42 pages.*
International Preliminary Report on Patentability and Written Opinion of the International Searching Authority Issued Nov. 6, 2012 in International (PCT) Application No. PCT/JP2011/058890.
International Search Report issued Jul. 19, 2011 in International (PCT) Application No. PCT/JP2011/058890, of which the present application is the national stage.

* cited by examiner

*Primary Examiner* — William Phillip Fletcher, III
(74) *Attorney, Agent, or Firm* — Wenderoth, Lind & Ponack, L.L.P.

(57) ABSTRACT

This invention provides a method for forming multilayer coating film, which comprises successively carrying out a step of applying an intermediate paint onto a coating object to form an intermediate coating film; a step of forming a base coating film by applying onto the intermediate coating film a water-based base coating paint; a step of forming a clear coating film by applying onto the base coating film a clear coating paint, and a step of heating the uncured intermediate coating film, base coating film and clear coating film to simultaneously cure these three coating films; wherein the intermediate paint has a complex viscosity at 40° C. ($\eta^*_{40}$) of not higher than 100 Pa·sec under the conditions of shear stress, 1.0 Pa and frequency, 0.1 Hz, and a complex viscosity at 80° C. ($\eta^*_{80}$) of at least 800 Pa·sec under the conditions of shear stress, 1.0 Pa and frequency, 0.1 Hz.

12 Claims, No Drawings

METHOD FOR FORMING MULTILAYER COATING FILM

TECHNICAL FIELD

This invention relates to a method for forming multilayer coating film having excellent appearance, by 3-coat-1-bake system comprising successively applying onto a coating object, an intermediate paint, a water-based base coating paint and clear coating paint, and heat-curing the resulting 3-layered multilayer coating film simultaneously.

BACKGROUND ART

As coating methods of car bodies, generally those for forming multilayer coating film by 3-coat-2-bake (3C2B) system comprising, after applying an electrodeposition paint on the coating object, application of intermediate paint→curing by baking→application of water-based base coating paint→preheating (preliminary heating)→application of clear coating paint→curing by baking, have been widely adopted. Whereas, for energy-saving, attempts are made in recent years to omit the bake-curing step after application of intermediate paint and adopt 3-coat-1-bake (3C1B) system comprising, after applying an electrodeposition paint on the coating object, application of intermediate paint→preheating (preliminary hearing)→application of water-based base coating paint→preheating (preliminary heating)→application of clear coating paint→curing by baking (e.g., see Patent Document 1).

However, because the intermediate paint and water-based base coating paint are applied one on another in uncured condition in the above 3-coat-1-bake system, layer mixing is apt to take place between adjacent coating films, which occasionally impairs smoothness or distinctness of image of resulting coating film.

As a countermeasure thereto, a method for suppressing such layer mixing of the intermediate coat with the water-based base coat thereon was tried in the past, wherein a curing agent which reacts at relatively low temperatures such as a polycarbodiimide compound was blended in the intermediate paint. This method, however, could not form a coating film having sufficient smoothness.

For example, Patent Document 2 disclosed that multilayer coating films having a high quality appearance could be obtained while controlling interfacial bleeding or inversion between coating film layers, in aforesaid 3-coat-1-bake coating system, when the water-based intermediate paint and/or water-based metallic base paint contains a polycarbodiimide compound and a carboxyl-containing aqueous resin. However, multilayer coating films formed by said method occasionally have insufficient smoothness.

PRIOR ART DOCUMENTS

Patent Documents

Patent Document 1: JP 2002-282773A
Patent Document 2: JP 2001-9357A

SUMMARY OF THE INVENTION

Problem to be Solved by the Invention

The object of the present invention is to provide a method for forming multilayer coating films excelling in smoothness and distinctness of image by 3-coat-1-bake system using an intermediate paint, water-based base coating paint and clear coating paint.

Means for Solving the Problems

We have engaged in concentrative studies for accomplishing the above object and now discovered that multilayer coating films excelling in smoothness and distinctness of image could be formed by use of an intermediate paint having specific complex viscosity in a coating process of a multilayer coating film by 3-coat-1-bake system using an intermediate paint, water-based base coating paint and clear coating paint, and thus come to complete the present invention.

Accordingly, therefore, the invention provides a method for forming multilayer coating film, which is characterized by successively carrying out the following steps (1)-(4):

(1) a step of applying an intermediate paint (X) onto a coating object to form an intermediate coating film, (2) a step of forming a base coating film by applying onto the uncured intermediate coating film as formed in the step (1) a water-based base coating paint (Y), (3) a step of forming a clear coating film by applying onto the uncured base coating film as formed in the step (2) a clear coating paint (Z), and (4) a step of heating the uncured intermediate coating film, base coating film and clear coating film, which are formed in the steps (1)-(3), to simultaneously cure these three coating films, wherein the intermediate paint (X) has a complex viscosity at 40° C. ($\eta^*_{40}$) of not higher than 100 Pa·sec, under the conditions of shear stress, 1.0 Pa and frequency, 0.1 Hz, and a complex viscosity at 80° C. ($\eta^*_{80}$) of at least 800 Pa·sec, under the conditions of shear stress, 1.0 Pa and frequency, 0.1 Hz.

Effect of the invention

According to the multilayer coating film-forming method of the present invention, multilayer coating film excelling in smoothness and distinctness of image can be formed on coating objects by 3-coat-1-bake system.

MODES FOR WORKING THE INVENTION

Hereinafter the multilayer coating film-forming method of the invention is explained in further details, by the order of each of the above steps.

Step (1):

In this step an intermediate paint (X) is applied onto a coating object to form an intermediate coating film.

Coating Objects

The coating objects to which an intermediate paint (X) is applicable according to the invention are not particularly limited and, for example, can be outer panel portions of car bodies such as automobiles, trucks, motorcycles, buses and the like; car parts; and outer panel portions of household electric appliances such as mobile telephones and audio instruments. In particular, outer panels of car bodies and car parts are preferred.

The materials making up such coating objects are not particularly limited, which include, for example, metallic materials such as iron, aluminum, brass, copper, tin plate, stainless steel, zinc-plated steel, alloyed zinc (e.g. Zn—Al, Zn—Ni, Zn—Fe), plated steel and the like; plastic materials including resins such as polyethylene resin, polypropylene resin, acrylonitrile-butadiene-styrene (ABS) resin, polyamide resin, acrylic resin, vinylidene chloride resin, polycarbonate resin, polyurethane resin, epoxy resin and various FRP; inorganic materials such as glass, cement, concrete and the like; wood; and fibrous materials (e.g., paper, fabric). Of these, metallic materials and plastic materials are preferred.

The coating objects may be metal surfaces of above metallic materials or of car bodies made thereof, which have been given a surface treatment such as phosphate treatment, chromate treatment or complex oxide treatment. Furthermore, the coating objects may be those metallic materials, car bodies and the like, on which undercoating film such as of various electrodeposition paints has been formed. In particular, car bodies on which an undercoating film of cationic electrodeposition paint has been formed are preferred.

Intermediate Paint (X)

As the intermediate paint (X) to be coated on above coating objects, a paint composition having a complex viscosity at 40° C. ($\eta^*_{40}$) of not higher than 100 Pa·sec, preferably not higher than 80 Pa·sec, inter alia, not higher than 70 Pa·sec, under the conditions of shear stress, 1.0 Pa and frequency, 0.1 Hz and a complex viscosity at 80° C. ($\eta^*_{80}$) of at least 800 Pa·sec, preferably at least 900 Pa·sec, inter alia, at least 1,000 Pa·sec, under the conditions of shear stress, 1.0 Pa and frequency, 0.1 Hz is used.

Where the complex viscosity ($\eta^*_{40}$) of the intermediate paint (X) exceeds 100 Pa·sec, there rises a possibility that the multilayer coating film eventually formed comes to show insufficient smoothness, and where the complex viscosity ($\eta^*_{80}$) of the intermediate paint (X) is lower than 800 Pa·sec, the multilayer coating film is liable to have insufficient distinctness of image.

The complex viscosity at 40° C. ($\eta^*_{40}$) and that at 80° C. ($\eta^*_{80}$) in the present specification are the complex viscosity values ($\eta^*$) as measured of the intermediate paint (X) with a visco-elasticity measuring device, under the conditions of shear stress: 1.0 Pa, frequency: 0.1 Hz, measurement initiating temperature: 25° C., measurement terminating temperature: 80° C., and temperature rise rate: 11° C./min. at 40° C. and 80° C., respectively.

As the intermediate paint (X), a liquid paint usually comprising a base resin, curing agent and solvent, and furthermore, where necessary, paint additives such as coloring pigment, extender, effect pigment, curing catalyst, thickener, UV absorber, photostabilizer, defoamer, plasticizer, organic solvent, surface regulating agent, antisettling agent and the like can be used. As the solvent, water and/or organic solvent can be used. In particular, the intermediate paint (X) preferably is in the form of water-based paint wherein the chief component of the solvent is water. As the curing agent, one which crosslinks with such a base resin at 70-90° C., preferably at about 80° C., can be used.

The complex viscosity at 40° C. ($\eta^*_{40}$) of the intermediate paint is adjustable, for example, through the weight-average molecular weight of the base resin used. Also the complex viscosity at 80° C. ($\eta^*_{80}$) is adjustable, for example, through the use ratio of the base resin to the curing agent. More specifically, an intermediate paint (X) having the specified complex viscosity values can be formulated by using as the base resin one having a relatively low weight-average molecular weight, and as the curing agent, a compound which crosslinks with the base resin at a relatively low reaction temperature such as about 80° C., for example in a quantity within a range of normally 18-50 mass %, preferably 20-40 mass %, based on the combined mass of the base resin and the curing agent.

As the reasons why the use of such an intermediate paint (X) having a complex viscosity at 40° C. ($\eta^*_{40}$) of not higher than 100 Pa·sec and a complex viscosity at 80° C. ($\eta^*_{80}$) of at least 800 Pa·sec in the method for forming a multilayer coating film of the present invention enables to form a multilayer coating film excelling in smoothness and distinctness of image, we infer that the relatively low complex viscosity at 40° C. ($\eta^*_{40}$) of the intermediate paint (X) such as not higher than 100 Pa·sec gives the paint high flowability after it is applied onto a coating object, enabling it to uniformly wet and spread on the object, to form a coating film of excellent smoothness. On the other hand, because the paint has the characteristic that its viscosity begins to rise at a stage of relatively low temperature, as indicated by its complex viscosity at 80° C. ($\eta^*_{80}$) of at least 800 Pa·sec, its layer mixing with the water-based base coating paint applied to form the overlayer is suppressed to give also excellent distinctness of image to the resulting multilayer coating film.

Examples of the base resin include polyester resin, acrylic resin, alkyd resin and polyurethane resin. Of those, polyester resins are preferred from the viewpoint of smoothness and distinctness of image of the coating film formed.

As the curing agent, for example, polyisocyanate compound, polycarbodiimide compound, melamine resin and the like can be used. Of those, polyisocyanate compound and/or polycarbodiimide compound is preferred from the viewpoint of smoothness and distinctness of image of the coating film formed.

As the intermediate paint (X), more specifically one preferably used is a paint composition comprising, for example, (A) a carboxyl-containing polyester resin having an acid value in a range of 30-70 mgKOH/g, a hydroxyl value in a range of 50-200 mgKOH/g, and a weight-average molecular weight in a range of 3,000-7,000 40-60 mass %

(B) a polyisocyanate compound (B-1) and/or a polycarbodiimide compound (B-2) 20-30 mass % and (C) a diester compound of a general formula (I):

[Chemical formula 1]

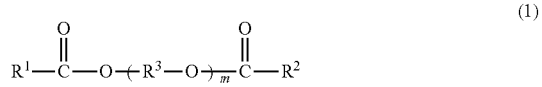

(1)

[in the formula, $R^1$ and $R^2$ stand for $C_{4-18}$ hydrocarbon groups independently of each other, $R^3$ stands for a $C_{2-4}$ alkylene group, and m is an integer of 3-25, said m oxyalkylene units ($R^3$—O) being the same or different]

10-35 mass %, where the contents of the components (A)-(C) are percent by weight based on the total solid content of the components (A)-(C).

The carboxyl-containing polyester resin (A) can be prepared, for example, by esterification reaction or ester-interchange reaction of a polybasic acid component and a polyhydric alcohol component, more specifically, for example, by the esterification at an equivalent ratio (COOH/OH) between the carboxyl group in the polybasic acid component and the hydroxyl group in the polyhydric alcohol component of more than 1, i.e., in the state that more carboxyl groups are present than hydroxyl groups.

The polybasic acid component encompasses such compounds having at least two carboxyl groups per molecule, examples of which include polybasic acids such as phthalic acid, isophthalic acid, terephthalic acid, succinic acid, gluaric acid, adipic acid, azelaic acid, sebacic acid, tetrahydrophthalic acid, hexahydrophthalic acid, maleic acid, fumaric acid, itaconic acid, trimellitic acid, pyromellitic acid and the like; anhydrides thereof; lower alkyl esters of these polybasic acids; and the like. These may be used either alone or in combination of two or more.

The polyhydric alcohol component encompasses such compounds having at least two hydroxyl groups per molecule, examples of which include α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxypropane-1,2-diol and the like; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (an ester of hydroxypivalic acid with neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetraoxaspiro[5,5]undecane, diethylene glycol, triethylene glycol, glycerine, diglycerine, triglycerine, pentaerythritol, dipentaerythritol, sorbitol, mannitol, trimethylolethane, trimethylolpropane, ditrimethylolpropane, tris(2-hydroxyethyl)isocyanurate and the like. These can be used either alone or in combination of two or more.

The esterification or ester-interchange reaction of above polybasic acid component with polyhydric alcohol component can be carried out by the means known per se, for example, by polycondensation of above polybasic acid component and polyhydric alcohol component, at about 180-about 250° C., preferably 200-240° C.

The carboxyl-containing polyester resin (A) may also be modified, where necessary, with fatty acid, monoepoxy compound and the like, either during the preparation of above polyester resin or after the esterification reaction. Examples of the fatty acid useful for the modification include coconut oil fatty acid, cotton seed oil fatty acid, hemp-seed oil fatty acid, rice bran oil fatty acid, fish oil fatty acid, tall oil fatty acid, soybean oil fatty acid, linseed oil fatty acid, tung oil fatty acid, rape oil fatty acid, castor oil fatty acid, dehydrated castor oil fatty acid, safflower oil fatty acid and the like; and examples of the monoepoxy compound include "CARDURA E10P" (tradename, HEXION Specialty Chemicals Co., glycidyl ester of synthetic highly branched saturated fatty acid) and the like.

The carboxyl-containing polyester resin (A) can have an acid value within a range of 30-70 mgKOH/g, preferably 30-65 mgKOH/g, inter alia, 35-60 mgKOH/g.

The carboxyl-containing polyester resin (A) can also have a hydroxyl value within a range of 50-200 mgKOH/g, preferably 60-175 mgKOH/g, inter alia, 70-150 mgKOH/g.

The carboxyl-containing polyester resin (A) can have a weight-average molecular weight within a range of 3,000-7,000, preferably 3,000-6,000, inter alia, 3,000-5,000.

The acid value, hydroxyl vale and weight-average molecular weight of the carboxyl-containing polyester resin (A) are controllable by, for example, varying the use ratio of the polybasic acid component and polyhydric alcohol component, or varying the temperature or time of the reaction between the polybasic acid component and polyhydric alcohol component.

In the present specification, the "weight-average molecular weight" is a value obtained by converting the retention time (retention capacity) of the test sample as measured with gel permeation chromatograph (GPC) to that of molecular weight of polystyrene according to the retention time (retention capacity), as measured under identical conditions, of the standard polystyrene of known molecular weight. Specifically, it can be measured with "HLC-8120GPC" (tradename, Tosoh Corporation) as the gel permeation chromatographing device, using 4 columns in total, i.e., each one of "TSKgel G4000HXL", "TSKgel G3000HXL", "TSKgel G2500HXL" and "TSKgel G2000HXL" (tradenames, Tosoh Corporation) and a differential refractometer as the detector, under the conditions of mobile phase: tetrahydrofuran, measuring temperature: 40° C., and flow rate: 1 mL/min.

From the viewpoint of smoothness of the multilayer coating film formed, it is preferred to use, as the carboxyl-containing polyester resin (A), a polyester resin (A1) containing 3.0-4.0 mol/kg (solid resin content), in particular, 3.2-3.8 mol/kg (solid resin content) of straight chain alkylene group having at least 4 carbon atoms in the molecules.

Such carboxyl-containing polyester resin (A1) which contains 3.0-4.0 mol/kg (solid resin content) of straight chain alkylene group having at least 4 carbon atoms in the molecules can be prepared, for example, by using as the polybasic acid component an aliphatic dicarboxylic acid having at least $C_4$ straight chain alkylene group and/or using as the polyhydric alcohol component an aliphatic diol having at least $C_4$ straight chain alkylene group.

Examples of the aliphatic dicarboxylic acid having at least $C_4$ straight chain alkylene group include adipic acid, azelaic acid and sebacic acid, which can be used each alone or in combination of two or more. Also examples of aliphatic diol having at least $C_4$ straight chain alkylene group include 1,4-butanediol, 1,5-pentanediol and 1,6-hexanediol, which can be used each alone or in combination of two or more.

In the present specification, the "content of straight chain alkylene group having at least 4 carbon atoms" is expressed by the mol number of at least $C_4$ straight chain alkylene group, which is contained in 1 kg (solid content) of the polyester resin. It can be calculated by dividing the total mol number (Wm) of at least $C_4$ straight chain alkylene groups contained in the monomers used for synthesizing the polyester resin, by the mass of the formed resin (Wr: unit, kg) excluding the water of condensation (i.e., Wm/Wr).

Said content of at least $C_4$ straight chain alkylene group is adjustable for example, by controlling the blend ratio of the aliphatic dicarboxylic acid having at least $C_4$ straight chain alkylene group in the polybasic acid component and that of the aliphatic diol having at least $C_4$ straight chain alkylene group in the polyhydric alcohol component.

The reason why the use of such a carboxyl-containing polyester resin (A1) containing 3.0-4.0 mol/kg (solid resin content) in the molecules as the carboxyl-containing polyester resin (A) leads to formation of a coating film of excellent smoothness is presumed to be the following. Because the carboxyl-containing polyester resin (A1) is prepared with use of an aliphatic dicarboxylic acid and an aliphatic diol, of relatively high content(s) of at least $C_4$ straight chain alkylene group, it is relatively less branched and has a linear structure, rendering entanglement among the resins difficult and the complex viscosity at 40° C. ($\eta^*_{40}$) low.

Examples of polyisocyanate compound (B-1) include aliphatic polyisocyanates such as hexamethylene diisocyanate, trimethylhexamethylene diisocyanate, dimeric acid diisocyanate and lysine diisocyanate; biuret type adducts or isocyanurate ring adducts of these aliphatic polyisocyanates; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate, and 1,2-cyclohexane diisocyanate; biuret type adducts or isocyanurate ring adducts of these alicyclic polyisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone, and isopropylidenebis-(4-phenylisocyanate); biuret type adducts or isocyanurate ring adducts of these aromatic polyisocyanates; hydrogenated MDI and hydrogenated MDI derivatives; polyisocyanates having at least three isocyanate groups per molecule such as triphenylmethane-4,4',4"-triisocyanate, 1,3,5-triisocyanatobenzene, 2,4,6-triisocyanatotoluene, and 4,4'-dimethyldiphenylmethane-2,2',5,5'-tetraisocyanate; biuret type adducts or isocyanurate ring adducts of these polyisocyanates; urethanated adducts formed by reaction of such polyisocyanate compounds with polyols such as ethylene glycol, propylene glycol, 1,4-butylene glycol, dimethylolpropionic acid, polyalkylene glycol, trimethylolpropane and hexanetriol, at such a ratio that the isocyanate groups become in excess of the hydroxyl groups in the polyol used; and biuret type adducts or isocyanurate ring adducts of these polyisocyanates.

As the polycarbodiimide compound (B-2), for example, those polyisocyanate compounds whose isocyanate groups are subjected to mutual de-carbon dioxide reaction can be used.

Specifically, as the polycarbodiimide compound (B-2), for example, "CARBODILITE E-01", "CARBODILITE E-02", "CARBODILITE SV-02", "CARBODILITE V-01", "CARBODILITE V-02", "CARBODILITE V-02-L2", "CARBODILITE V-03", "CARBODILITE V-04", "CARBODILITE V-05", "CARBODILITE V-07", "CARBODILITE V-09" (tradenames, Nisshinbo Chemical Inc.) and the like can be used. These polycarbodiimide compounds can be used each alone or in combination of two or more.

As the reason why the use of the polyisocyanate compound (B-1) and/or polycarbodiimide compound (B-2) as the curing agent allows formation of a coating film having excellent distinctness of image, we infer that the crosslinking reaction of the polyisocyanate compound (B-1) and the polycarbodiimide compound (B-2) with the base resin at relatively low temperatures as around 80° C. raises the complex viscosity at 80° C. ($\eta^*_{80}$) and makes the layer mixing between the intermediate coating film and its overlayer of a water-based base coating film difficult to take place.

The diester compound (C) is a compound of the general formula (1);

[Chemical formula 2]

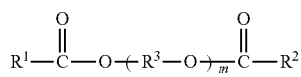

(1)

[in the formula, $R^1$ and $R^2$ stand for $C_{4-18}$, preferably $C_{5-11}$ inter alia, $C_{5-9}$ hydrocarbon groups independently of each other, $R^3$ stands for a $C_{2-4}$ alkylene group, and m is an integer of 3-25, preferably 3-20, inter alia, 4-10, said m oxyalkylene units ($R^3$—O) being the same or different]

The diester compound (C) preferably has a molecular weight in a range of generally 320-1,400, in particular, 350-1,200, inter alia, 400-1,000.

The diester compound (C) is preferably that of polyoxyalkylene glycol and aliphatic monocarboxylic acid. Specifically, the diester compound (C) can be obtained, for example, through an esterification reaction of a polyoxyalkylene glycol having two end hydroxyl groups with a monocarboxylic acid having $C_{4-18}$ hydrocarbon group.

Examples of the polyoxyalkylene glycol include polyethylene glycol, polypropylene glycol, block copolymers of polyethylene and propylene glycol, and polybutylene glycol. Of these, use of polyethylene glycol is particularly preferred.

These polyoxyalkylene glycols preferably have a number average molecular weight in a range of generally 100-1,200, in particular, 150-600, inter alia, 200-400.

Examples of the monocarboxylic acid having $C_{4-18}$ hydrocarbon group include pentanoic acid, hexanoic acid, 2-ethylbutanoic acid, 3-methylpentanoic acid, benzoic acid, cyclohexanecarboxylic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid, dodecanoic acid, hexadecanoic acid and octadecanoic acid.

Those polyoxyalkylene glycols and monocarboxylic acids can be used either each alone or in combination of two or more.

The diesterification reaction of such polyoxyalkylene glycol with monocarboxylic acids having $C_{4-18}$ hydrocarbon group can be performed by any of per se known methods.

Particularly when the intermediate paint (X) contains above diester compound (C) and the carboxyl-containing polyester resin (A1) which contains in its molecules 3.0-4.0 mol/kg (solid resin content) of at least $C_4$ straight chain alkylene group, it becomes possible to lower the complex viscosity at 40° C. ($\eta^*_{40}$), enabling formation of a multilayer coating film of particularly excellent smoothness.

The intermediate paint (X) can be applied onto a coating object by the means known per se, for example, air spray, airless spray, rotary atomizing coater or the like. Static electricity may be impressed at the coating time. The coated film thickness can be normally in the range of 10-40 μm, preferably 15-30 μm, in terms of cured film thickness.

Step (2):

Onto the coating film of the intermediate paint (X) (which hereafter may be referred to as "intermediate coating film") as formed in the step (1), then a water-based base coating paint (Y) is coated.

The intermediate coating film may be preheated (given a preliminary heating) under the conditions as will not cause substantial curing of the film, before application of the water-based base coating paint (Y). The preheating temperature preferably is in the range of usually about 40-about 100° C., in particular, about 50-about 90° C., and the preheating time can be usually around 1-60 minutes, preferably around 5-20 minutes.

The water-based base coating paint (Y) generally aims at imparting fine appearance to its coating objects. The paint (Y) can be formulated by, for example, dissolving or dispersing in an aqueous medium a base resin and curing agent, together with pigment and other paint additives.

As the base resin, for example, acrylic resin, polyester resin, alkyd resin, urethane resin, epoxy resin and the like can be used, and as the curing agent, for example, optionally blocked polyisocyanate compound, melamine resin, urea resin and the like can be used.

As the pigment, coloring pigment, effect pigment, and the like can be used. Examples of coloring pigment include titanium oxide, zinc flower, carbon black, molybdenum red, Prussian blue, cobalt blue, azo pigment, phthalocyanine pigment, quinacridone pigment, isoindoline pigment vat (anthraquinone) pigment, perylene pigment, dioxazine pigment, diketopyrrolopyrrole, and the like which can be used either each alone or in combination of two or more.

Examples of effect pigment include aluminum (including vapor-deposited aluminum), copper, zinc, brass, nickel, aluminum oxide, mica, aluminum oxide coated with titanium oxide or iron oxide, mica coated with titanium oxide or iron oxide, glass flakes, hologram pigment and the like, which can be used each alone or in combination of two or more.

The water-based base coating paint (Y) can be applied by the means known per se, for example, air spray, airless spray, rotary atomizing coater or the like. Static electricity may be impressed at the coating time. The coated film thickness can be normally 2-20 μm, preferably 3-18 μm, in terms of cured film thickness.

Step (3)

Onto the coating film of the water-based base coating paint (Y) (hereafter may be referred to as "the base coating film") as formed in above step (2), further a clear coating paint (Z) is coated.

As the clear coating paint (Z), those per se known thermosetting clear coating paint compositions for coating car bodies and the like can be used. As such thermosetting clear coating paint compositions, for example, organic solvent-based thermosetting paint compositions, water-based thermosetting paint compositions or powder thermosetting paint compositions, which contain base resins and curing agents can be named.

Examples of the base resin include crosslinkable functional group-containing acrylic resin, polyester resin, alkyd resin, urethane resin, epoxy resin and fluorine-containing resin, and examples of the curing agent include polyisocyanate compound, blocked polyisocyanate compound, melamine resin, urea resin, carboxyl-containing compound, carboxyl-containing resin, epoxy-containing resin and epoxy-containing compound.

Examples of preferred base resin/curing agent combination in the clear coating paint (Z) include: carboxyl-containing resin/epoxy-containing resin, hydroxyl-containing resin/polyisocyanate compound, hydroxyl-containing resin/blocked polyisocyanate compound, and hydroxyl-containing resin/melamine resin.

The clear coating paint (Y) may be one-package type or multi-package type like two-package type urethane resin paint.

The clear coating paint (Z) may further contain, where necessary, coloring pigment, effect pigment, dye and the like, to an extent not interfering with transparency, and furthermore can suitably contain extender, ultraviolet absorber, light stabilizer, defoamer, thickener, rust proofing agent, surface regulating agent, and the like.

The clear coating paint (Z) can be applied onto the coated film surface of the water-based base coating paint (Y) by the means known per se, for example, air spray, airless spray, rotary atomizing coater or the like. Static electricity may be impressed at the coating time. The clear coating paint (Z) can be applied to form a coating film of the thickness in the range of normally 10-80 μm, preferably 15-60 μm, inter alia, 20-50 μm, in terms of dry film thickness.

Step (4)

According to the multilayer coating film-forming method of the present invention, the uncured intermediate coating film, uncured base coat coating film and uncured clear coating film as formed in the above steps (1)-(3) are simultaneously heated and cured.

Curing of the intermediate coating film, base coat coating film and clear coating film, can be carried out by ordinary baking means of coating film, such as hot air heating, infrared heating, high frequency heating and the like.

The heating temperature ranges normally about 80-about 180° C., preferably about 100-about 170° C., inter alia, about 120-about 160° C. Preferred heating time normally ranges around 10-60 minutes, in particular, around 15-40 minutes. Such heating can simultaneously cure the multilayer coating film formed of the three layers of intermediate coating film, base coat coating film and clear coating film.

EXAMPLES

Hereinafter the invention is explained more specifically, referring to working Examples and Comparative Examples, it being understood that the invention is not limited to these Examples only. "Part" and "%" both are by mass.

Preparation of Carboxyl-Containing Polyester Resin (A)

Production Example 1

A reactor equipped with a thermometer, thermostat, stirrer, reflux condenser and water separator was charged with adipic acid 342 g, 1,2-cyclohexanedicarboxylic anhydride 185 g, isophthalic acid 249 g, 1,6-hexanediol 354 g, 2-butyl-2-ethyl-1,3-propanediol 384 g and trimethylolpropane 82 g, and the temperature therein was raised from 160° C. to 230° C. over three hours. The system was allowed to react until the acid value dropped to not higher than 5 mgKOH/g, while distilling off the water of condensation with the water separator and maintaining the temperature of 230° C. Trimellitic anhydride 88 g was added to the reaction product, followed by the addition reaction at 170° C. for 30 minutes. Thereafter a mixed solvent of xylene/"SWAZOL 1000" (tradename, Maruzen Petrochemical Co., a high-temperature boiling aromatic solvent)=50/50 (by mass) was added to provide a carboxyl-containing polyester resin solution (A-1) of 45% in solid concentration. Thus obtained carboxyl-containing polyester resin (A-1) had an acid value of 36 mgKOH/g, hydroxyl value of 80 mgKOH/g, weight-average molecular weight of 4,800 and number-average molecular weight of 1,460.

The content of at least $C_4$ straight chain alkylene group in so obtained carboxyl-containing polyester resin (A-1) was calculated as follows.

mol number ($Wm$) of at least $C_4$ straight chain alkylene group =

$342/146$ (adipic acid) + $354/118$ (1,6-hexanediol) = $5.34$ (mol).

mass of water of condensation = $18 \times \{2 \times 342/146$ (adipic acid) +

$1 \times 185/154$ (1,2-cyclohexanedicarboxylic anhydride) +

$2 \times 249/166$ (isophthalic acid)$\} = 160$ [g].

Mass of formed resin ($Wr$), excluding the water of condensation =

$342$ (adipic acid) + $185$ (1,2-cyclohexanedicarboxylic anhydride) +

-continued 249 (isophthalic acid) + 354 (1,6-hexanediol) +

384 (2-butyl-2-ethyl-1,3-propanediol) +

82 (trimethylolpropane) + 88 (trimellitic anhydride) −

160 (water of condensation) = 1523 [g] = 1.523 [kg].

content of at least $C_4$ straight chain alkylene group = mol number ($Wm$) of at least $C_4$ straightchain alkylene group/mass of formed resin ($Wr$) excluding the water of condensation = 5.34/1.523 = 3.5 [mol/kg (solid resin content)].

Production Examples 2-4

Carboxyl-containing polyester resin solutions (A-2)-(A-4) were obtained through reactions of the monomer components at the blend ratios as shown in the following Table 1, in the manner similar to Production Example 1. The acid values, hydroxyl values, weight-average molecular weights, number-average molecular weights, and at least $C_4$ straight chain alkylene group contents of the resulting carboxyl-containing polyester resins (A-2)-(A-4) are shown in the Table 1, concurrently with those of the carboxyl-containing polyester resin solution (A-1) as obtained in Production Example 1.

temperature therein was raised from 160° C. to 230° C. over three hours. The system was allowed to react until the acid value dropped to not higher than 5 mgKOH/g, while distilling off the water of condensation with the water separator and maintaining the temperature of 230° C. Trimellitic anhydride 88 g was added to the reaction product, followed by the addition reaction at 170° C. for 30 minutes. Thereafter the addition reaction product was cooled to a temperature not higher than 50° C. and neutralized by addition of 0.9 equivalent amount to the acid group therein of 2-(dimethylamino) ethanol, to which then deionized water was slowly added to provide an aqueous dispersion of a carboxyl-containing polyester resin (A-5) of 45% in solid concentration and pH7.2. Thus obtained carboxyl-containing polyester resin (A-5) had an acid value of 36 mgKOH/g, hydroxyl value of 80 mgKOH/g, weight-average molecular weight of 4,800, and number-average molecular weight of 1,460.

Production Examples 6-8

Aqueous dispersions of carboxyl-containing polyester resin (A-6)-(A-8) were obtained through reactions of the monomer components at the blend ratios as shown in the following Table 2, in the manner similar to Production

TABLE 1

| | | | Production Example | | | |
|---|---|---|---|---|---|---|
| | | | 1 | 2 | 3 | 4 |
| Carboxyl-containing polyester resin solution | | | A-1 | A-2 | A-3 | A-4 |
| Polybasic acid component | aliphatic dicarboxylic acid having at least $C_4$ straight chain alkylene group | adipic acid (molecular weight 146) | 342 | 342 | 342 | 342 |
| | | 1,2-cyclohexanedicarboxylic anhydride (molecular weight 154) | 185 | 185 | 185 | 185 |
| | | isophthalic acid (molecular weight 166) | 249 | 249 | 249 | 249 |
| Polyhydric alcohol component | aliphatic diol having at least $C_4$ straight chain alkylene group | 1,6-hexanediol (molecular weight 118) | 354 | 283 | 212 | 142 |
| | | 2-butyl-2-ethyl-1,3-propane-diol (molecular weight 160) | 384 | 384 | 384 | 384 |
| | | trimethylolpropane (molecular weight 134) | 82 | 164 | 246 | 328 |
| Polybasic acid component | | trimellitic anhydride (molecular weight 192) | 88 | 85 | 85 | 85 |
| Acid value [mgKOH/g] | | | 36 | 35 | 36 | 35 |
| Hydroxyl value [mgKOH/g] | | | 80 | 100 | 120 | 150 |
| Weight-average molecular weight | | | 4,800 | 6,500 | 8,000 | 10,000 |
| Number-average molecular weight | | | 1,460 | 1,470 | 1,480 | 1,490 |
| At least $C_4$ straight chain alkylene group content [mol/kg (solid resin content)] | | | 3.5 | 3.1 | 2.7 | 2.3 |

Production Example 5

A reactor equipped with a thermometer, thermostat, stirrer, reflux condenser and water separator was charged with adipic acid 342 g, 1,2-cyclohexanedicarboxylic anhydride 185 g, isophthalic acid 249 g, 1,6-hexanediol 354 g, 2-butyl-2-ethyl-1,3-propanediol 384 g and trimethylolpropane 82 g, and the Example 5. The acid values, hydroxyl values, weight-average molecular weights, number-average molecular weights, and the contents of at least $C_4$ straight chain alkylene group in the resulting carboxyl-containing polyester resins (A-6)-(A-8) are shown in the Table 2, concurrently with those of the aqueous dispersion of carboxyl-containing polyester resin (A-5) as obtained in Production Example 5.

TABLE 2

|  |  |  | Production Example | | | |
|---|---|---|---|---|---|---|
|  |  |  | 5 | 6 | 7 | 8 |
| Aqueous dispersions of carboxyl-containing polyester resin | | | A-5 | A-6 | A-7 | A-8 |
| Polybasic acid component | aliphatic dicarboxylic acid having at least $C_4$ straight chain alkylene group | adipic acid (molecular weight 146) | 342 | 342 | 88 | 342 |
|  |  | 1,2-cyclohexanedicarboxylic anhydride (molecular weight 154) | 185 | 185 | 480 | 185 |
|  |  | isophthalic acid (molecular weight 166) | 249 | 249 | 199 | 249 |
| Polyhydric alcohol component | aliphatic diol having at least $C_4$ straight chain alkylene group | 1,6-hexanediol (molecular weight 118) | 354 | 319 |  | 142 |
|  |  | 2-butyl-2-ethyl-1,3-propane-diol (molecular weight 160) | 384 | 384 | 336 | 384 |
|  |  | neopentyl glycol (molecular weight 105) |  |  | 189 |  |
|  |  | trimethylolpropane (molecular weight 134) | 82 | 123 | 287 | 328 |
| Polybasic acid component |  | trimellitic anhydride (molecular weight 192) | 88 | 85 | 86 | 85 |
| Acid value [mgKOH/g] | | | 36 | 55 | 35 | 35 |
| Hydroxyl value [mgKOH/g] | | | 80 | 77 | 140 | 150 |
| Weight-average molecular weight | | | 4,800 | 5,800 | 7,500 | 10,000 |
| Number-average molecular weight | | | 1,460 | 1,520 | 1,360 | 1,490 |
| At least $C_4$ straight chain alkylene group content [mol/kg (solid resin content)] | | | 3.5 | 3.2 | 0.4 | 2.3 |

Preparation of Intermediate Paint (X)

Production Example 9

The carboxyl-containing polyester resin solution (A-1) as obtained in Production Example 134 parts, "JR-806" (tradename, Tayca Corporation, rutile type titanium dioxide) 50 parts, "Carbon MA-100" (tradename, Mitsubishi Chemical Co., carbon black) 0.5 part, xylene 20 parts and glass beads were mixed and dispersed with a paint shaker for 30 minutes. Removing the glass beads from the mixture, a pigment-dispersed paste was obtained. Thus obtained pigment-dispersed paste 104.5 parts, carboxyl-containing polyester resin solution (A-1) as obtained in Production Example 1188 parts and "SUMIDUR N-3300" (tradename, Sumika Bayer Urethane Co., a polyisocyanate compound, solid content 100%) 53 parts were uniformly mixed, and to the resulting mixture a mixed solvent of xylene/"SWAZOL 1000" (tradename, Maruzen Petrochemical Co., a high temperature-boiling aromatic solvent)=50/50 (by mass) was added to provide an intermediate paint (X-1) having a viscosity of 20 seconds at 20° C. as measured with Ford cup No. 4.

Production Examples 10-1.6

Production Example 9 was repeated except that the composition of the blend was varied as shown in the following Table 3, to provide intermediate paints (X-2)-(X-8). The complex viscosity values at 40° C. ($\eta^*_{40}$) and those at 80° C. ($\eta^*_{80}$) of the resultant intermediate paints (X-2)-(X-8) as measured under the conditions of shear stress 1.0 Pa and frequency 0.1 Hz are shown in the following Table 3, concurrently with those of the intermediate paint (X-1) as obtained in Production Example 9. The measurements of the complex viscosity values ($\eta^*_{40}$) and ($\eta^*_{80}$) were conducted with "HAAKE RheoStress RS150" (tradename, HAAKE, Ltd.) under the conditions of: shear stress: 1.0 Pa, frequency: 0.1 Hz, measurement-initiation temp.: 25° C., measurement-termination temp.: 80° C., and temperature rise rate: 11° C./min.

TABLE 3

|  |  |  | Production Example | | | | | | | |
|---|---|---|---|---|---|---|---|---|---|---|
|  |  |  | 9 | 10 | 11 | 12 | 13 | 14 | 15 | 16 |
|  | Intermediate paint (X) |  | X-1 | X-2 | X-3 | X-4 | X-5 | X-6 | X-7 | X-8 |
| Pigment-dispersed paste | Carboxyl-containing polyester resin (A) | Kind | A-1 | A-1 | A-1 | A-1 | A-2 | A-1 | A-3 | A-4 |
|  |  | Amount | 34 | 34 | 34 | 34 | 34 | 34 | 34 | 34 |
|  | "JR-806" |  | 50 | 50 | 50 | 50 | 50 | 50 | 50 | 50 |
|  | "CARBON MA-100" |  | 0.5 | 0.5 | 0.5 | 0.5 | 0.5 | 0.5 | 0.5 | 0.5 |
| Carboxyl-containing polyester resin (A) |  | Kind | A-1 | A-1 | A-1 | A-1 | A-2 | A-1 | A-3 | A-4 |
|  |  | Amount | 188 | 188 | 188 | 188 | 188 | 188 | 188 | 188 |
| Polyisocyanate compound (B) | "SUMIDUR N-3300" |  | 53 |  | 34 | 24 | 53 | 21 | 53 | 53 |

TABLE 3-continued

| | Production Example | | | | | | | |
|---|---|---|---|---|---|---|---|---|
| | 9 | 10 | 11 | 12 | 13 | 14 | 15 | 16 |
| Polycarbodiimide "CARBODILITE V-03"[Note 1] comound (B) | | 90 | | | | | | |
| Complex viscosity at 40° C. ($\eta$ * 40) [Pa · sec] | 2 | 2 | 2 | 2 | 70 | 2 | 110 | 210 |
| Complex viscosity at 80° C. ($\eta$ * 80) [Pa · sec] | 47,600 | 12,900 | 41,200 | 3,600 | 45,000 | 450 | 45,700 | 46,500 |

[Note 1]"Carbodilite V-03" (tradename, Nisshinbo Chemical Inc. a polycarbodiimide compound, solid content 50%)

Production Example 17

The aqueous dispersion of carboxyl-containing polyester resin (A-5) as obtained in Production Example 534 parts, "JR-806" (tradename, Tayca Corporation, rutile type titanium dioxide) 50 parts, "Carbon MA-100" (tradename, Mitsubishi Chemical Co., carbon black) 0.5 part, deionized water 20 parts and glass beads were mixed and dispersed with a paint shaker for 30 minutes. Removing the glass beads from the mixture, a pigment-dispersed paste was obtained. Thus obtained pigment-dispersed paste 104.5 parts, the aqueous dispersion of carboxyl-containing polyester resin (A-5) as obtained in Production Example 5188 parts, "BAYHYDUR VPLS2319" (tradename, Sumika Bayer Urethane Co., a polyisocyanate compound, solid content 100%) 84 parts, and later specified diester compound (C-1) 26 parts were uniformly mixed. Then "PRIMAL ASE-60" (tradename, Rohm and Haas Co., a polyacrylic acid-type thickener), 2-(dimethylamino)ethanol and deionized water were added to the resulting mixture to provide an intermediate paint (X-9) having a pH 8.0, solid paint content 50% and viscosity of 40 seconds at 20° C. as measured with Ford cup No. 4.

Diester compound (C-1): a diester compound of polyoxyethylene glycol with n-hexanoic acid, whose $R^1$ and $R^2$ are pentyl, $R^3$ is ethylene and m is 5, referring to the general formula (1).

Production Examples 18-24

Production Example 17 was repeated except that the composition of the blend was varied as shown in the following Table 4, to provide intermediate paints (X-10)-(X-16). The complex viscosity values at 40° C. ($\eta^*_{40}$) and those at 80° C. ($\eta^*_{80}$) of the resultant intermediate paints (X-10)-(X-16) as measured under the conditions of shear stress 1.0 Pa and frequency 0.1 Hz are shown in the following Table 4, concurrently with those of the intermediate paint (X-9) as obtained in Production Example 17.

TABLE 4

| | | | Production Example | | | | | | | |
|---|---|---|---|---|---|---|---|---|---|---|
| | | | 17 | 18 | 19 | 20 | 21 | 22 | 23 | 24 |
| | Intermediate paint (X) | | X-9 | X-10 | X-11 | X-12 | X-13 | X-14 | X-15 | X-16 |
| Pigment-dispersed paste | Carboxyl-containing polyester resin (A) | kind | A-5 | A-5 | A-5 | A-5 | A-6 | A-5 | A-7 | A-8 |
| | | amount | 34 | 34 | 34 | 34 | 34 | 34 | 34 | 34 |
| | "JR-806" | | 50 | 50 | 50 | 50 | 50 | 50 | 50 | 50 |
| | "CARBON MA-100" | | 0.5 | 0.5 | 0.5 | 0.5 | 0.5 | 0.5 | 0.5 | 0.5 |
| Carboxyl-containing polyester resin (A) | | kind | A-5 | A-5 | A-5 | A-5 | A-6 | A-5 | A-7 | A-8 |
| | | amount | 188 | 188 | 188 | 188 | 188 | 188 | 188 | 188 |
| Polyisocyanate compound (B) | "BAYHYDUR VPLS2319" | | 84 | | | | | | | |
| Polycarbodiimide comound (B) | "CARBODILITE E-02"[Note 2] | | | 158 | 88 | 120 | 120 | | 120 | 158 |
| Diester compound (C) | Diester compound (C) | | 26 | | | 37 | 37 | | 37 | |
| Melamine resin | "CYMEL 325"[note 3] | | | | 68 | 93 | 93 | 56 | 93 | |
| Complex viscosity at 40° C. ($\eta$ * 40) [Pa · sec] | | | 27 | 65 | 60 | 55 | 90 | 3 | 150 | 310 |
| Complex viscosity at 80° C. ($\eta$ * 80) [Pa · sec] | | | 6,050 | 1,160 | 1,100 | 860 | 1,450 | 2 | 1,810 | 2,500 |

[Note 2]"Carbodilite E-02" (tradename, Nisshinbo Chemical Inc., a carbodiimide compound, solid conent 40%)
[note 3]"Cymel 325" (tradename, Nihon Cytec Industries, Inc., a melamine resin, solid content 80%)

Preparation of Test Panels

Using the intermediate paints (X-1)-(X-16) as obtained in Production Examples 9-24, test panels were prepared as follows, and their evaluation tests were conducted.

(Preparation of Test Coating Object)

Zinc phosphated, cold-rolled steel sheet was electrocoated with a cationic electrodeposition paint ("ELECTRON GT-10", tradename, Kansai Paint Co.) to a cured film thickness of 20 μm, followed by 30 minutes' heating at 170° C. for curing to provide a test coating object.

Example 1

Onto the above test coating object, the intermediate paint (X-1) as obtained in Production Example 1 was electrostatically applied with a rotary atomizing type electrostatic coater, to a cured film thickness of 25 μm, and preheated at 80° C. for 5 minutes. Successively onto the uncured intermediate coating film, a water-based base coating paint ("WBC-720H", tradename, Kansai Paint Co., which may be hereafter referred to as "water-based second coloring paint (Y-1)") was electrostatically applied with a rotary atomizing type electrostatic coater to a cured film thickness of 12 μM, and preheated at 80° C. for 3 minutes. Then onto the uncured second coloring coating film a clear coating paint ("K430H", tradename, Kansai Paint Co., which may be hereafter referred to as "clear coating paint (Z-1)") was electrostatically applied to a cured film thickness of 35 μm, followed by 7 minutes' standing. Thereafter the intermediate coating film, second coloring coating film and clear coating film were simultaneously cured by heating at 140° C. for 30 minutes, to provide a test panel.

Examples 2-10, Comparative Examples 1-6

By the method same to that of Example 1 except that the intermediate paint was replaced with those shown in the following Table 5, respectively, test panels were prepared.

Evaluation Tests

Each of the test panels as obtained in Examples 2-10 and Comparative Examples 1-6 was evaluated by the following test methods. The results of the evaluation are shown in the following Table 5.

(Test Methods)

Smoothness: Smoothness of each test panel was evaluated by Long Wave (LW) value measured with "Wave Scan" (tradename, BYK Gardner Co). The less the LW value, the higher the smoothness of the coated surface.

Distinctness of image: Distinctness of image of each test panel was evaluated by Short Wave (SW) value measured with "Wave Scan". The less the SW value, the higher the distinctness of image of the coated surface.

Finished effect: Appearance of the coated surface of each multilayer coating film was visually evaluated:
⊙: finely finished
○: finely finished except very slight undulation
Δ: degradation in finished effect seen in at least one aspect of undulation, gloss loss and ripple skin
x: heavy degradation in finished effect seen in at least one aspect of undulation, gloss loss and ripple skin.

TABLE 5

|  |  | Intermediate paint (X) | Water-based base coating paint (Y) | Clear coating paint (Z) | Result of evaluation | | |
| --- | --- | --- | --- | --- | --- | --- | --- |
|  |  |  |  |  | Smoothness | Distinctness of image | Finished effect |
| Example | 1 | X-1 | Y-1 | Z-1 | 4 | 10 | ○ |
|  | 2 | X-2 | Y-1 | Z-1 | 5 | 11 | ○ |
|  | 3 | X-3 | Y-1 | Z-1 | 5 | 14 | ○ |
|  | 4 | X-4 | Y-1 | Z-1 | 6 | 15 | ○ |
|  | 5 | X-5 | Y-1 | Z-1 | 8 | 12 | ○ |
|  | 6 | X-9 | Y-1 | Z-1 | 5 | 13 | ○ |
|  | 7 | X-10 | Y-1 | Z-1 | 6 | 12 | ○ |
|  | 8 | X-11 | Y-1 | Z-1 | 6 | 13 | ○ |
|  | 9 | X-12 | Y-1 | Z-1 | 4 | 11 | ⊙ |
|  | 10 | X-13 | Y-1 | Z-1 | 7 | 13 | ○ |
| Comparative Example | 1 | X-6 | Y-1 | Z-1 | 6 | 19 | Δ |
|  | 2 | X-7 | Y-1 | Z-1 | 11 | 14 | Δ |
|  | 3 | X-8 | Y-1 | Z-1 | 12 | 14 | Δ |
|  | 4 | X-14 | Y-1 | Z-1 | 23 | 37 | X |
|  | 5 | X-15 | Y-1 | Z-1 | 9 | 14 | Δ |
|  | 6 | X-16 | Y-1 | Z-1 | 12 | 15 | Δ |

⊙: finely finished
○: finely finished except very slight undulation
Δ: degradation in finished effect seen in at least one aspect of undulation, gloss loss and ripple skin
X: heavy degradation in finished effet seen in at least one aspect of undulation, gloss loss and ripple skin.

The invention claimed is:

1. A method for forming a multilayer coating film, which is characterized by successively carrying out the following steps (1)-(4):

(1) applying an intermediate paint (X) onto a coating object to form an intermediate coating film, (2) forming a base coating film by applying a water-based base coating paint (Y) onto the uncured intermediate coating film as formed in step (1), (3) forming a clear coating film by applying a clear coating paint (Z) onto the uncured base coating film as formed in the step (2), and (4) heating the uncured intermediate coating film, base coating film and clear coating film, which are formed in steps (1)-(3), to simultaneously cure these three coating films, wherein the intermediate paint (X) has a complex viscosity at 40° C. ($\eta^*_{40}$) of not higher than 100 Pa·sec, under the conditions of shear stress of 1.0 Pa and frequency of 0.1 Hz, and a complex viscosity at 80° C. ($\eta^*_{80}$) of at least 800 Pa·sec, under the conditions of shear stress of 1.0 Pa and frequency of 0.1 Hz; and wherein the intermediate paint (X) comprises:

(A) 40-60 mass % of a carboxyl-containing polyester resin having an acid value in a range of 30-70 mgKOH/g, a hydroxyl value in a range of 50-200 mgKOH/g, and a weight-average molecular weight in a range of 3,000-7,000, (B) 20-30 mass % of a polyisocyanate compound (B-1) and/or a polycarbodiimide compound (B-2), and (C) 10-35 mass % of a diester compound of a general formula (1):

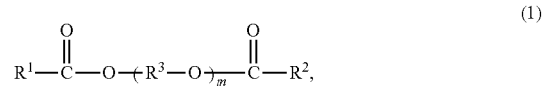

wherein, in general formula 1, $R^1$ and $R^2$ stand for $C_{4-18}$ hydrocarbon groups independent of each other, $R^3$ stands for a $C_{2-4}$ alkylene group, and m is an integer of 3-25, said m oxyalkylene units ($R^3$—O) being the same or different, wherein the contents of the components (A)-(C) are percent by weight based on the total solid content of the components (A)-(C), and wherein the carboxyl-containing polyester resin (A) contains 3.0-4.0 mol/kg (solid resin content) of straight chain alkylene group having at least 4 carbon atoms in the molecules.

2. The method for forming a multilayer coating film according to claim 1, wherein the intermediate paint (X) has a complex viscosity at 40° C. ($\eta^*_{40}$) of not higher than 70 Pa·sec under the conditions of shear stress of 1.0 Pa and frequency of 0.1 Hz, and a complex viscosity at 80° C. ($\eta^*_{80}$) of at least 1,000 Pa·sec.

3. The method for forming a multilayer coating film according to claim 1, wherein the intermediate paint (X) contains polyester resin as a base resin.

4. The method for forming a multilayer coating film according to claim 1, wherein the intermediate paint (X) contains polyisocyanate compound and/or polycarbodiimide compound as a curing agent.

5. The method for forming a multilayer coating film according to claim 1, wherein the intermediate paint (X) is a water-based paint.

6. The method for forming a multilayer coating film according to claim 1, wherein the uncured intermediate coating film is preheated at temperatures of 40-100° C. for 1-60 minutes in step (2), before coating the water-based base coating paint (Y) onto the uncured intermediate coating film.

7. An article having the multilayer coating film formed by the method of claim 1.

8. An article having the multilayer coating film formed by the method of claim 2.

9. An article having the multilayer coating film formed by the method of claim 3.

10. An article having the multilayer coating film formed by the method of claim 4.

11. An article having the multilayer coating film formed by the method of claim 5.

12. An article having the multilayer coating film formed by the method of claim 6.

* * * * *